(12) United States Patent
Kwon et al.

(10) Patent No.: US 10,409,279 B2
(45) Date of Patent: Sep. 10, 2019

(54) EFFICIENT SITUATIONAL AWARENESS BY EVENT GENERATION AND EPISODIC MEMORY RECALL FOR AUTONOMOUS DRIVING SYSTEMS

(71) Applicant: GM GLOBAL TECHNOLOGY OPERATIONS LLC, Detroit, MI (US)

(72) Inventors: Hyukseong Kwon, Thousand Oaks, CA (US); Youngkwan Cho, Los Angeles, CA (US); Rajan Bhattacharyya, Sherman Oaks, CA (US); Michael J. Daily, Thousand Oaks, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 150 days.

(21) Appl. No.: 15/420,946

(22) Filed: Jan. 31, 2017

(65) Prior Publication Data

US 2018/0217595 A1    Aug. 2, 2018

(51) Int. Cl.
| G05B 1/00 | (2006.01) |
| G05D 1/00 | (2006.01) |
| G06N 7/00 | (2006.01) |
| H04L 29/08 | (2006.01) |
| G06N 5/02 | (2006.01) |

(52) U.S. Cl.
CPC ............. *G05D 1/0088* (2013.01); *G06N 5/02* (2013.01); *G06N 7/005* (2013.01); *H04L 67/12* (2013.01)

(58) Field of Classification Search
CPC ............................ G05D 1/0088; G06N 7/005
See application file for complete search history.

(56) References Cited

U.S. PATENT DOCUMENTS

| 2011/0060425 | A1* | 3/2011 | Freed ........................ G06N 5/04 700/34 |
| 2016/0042640 | A1* | 2/2016 | Saptharishi .............. H04N 7/18 348/135 |
| 2016/0082597 | A1* | 3/2016 | Gorshechnikov ........ G06N 5/02 700/253 |
| 2016/0259775 | A1* | 9/2016 | Gelfenbeyn .......... G06F 17/279 |
| 2017/0185823 | A1* | 6/2017 | Gold .................. G06K 9/00214 |
| 2018/0075309 | A1* | 3/2018 | Sathyanarayana ... G05D 1/0088 |

* cited by examiner

*Primary Examiner* — Jess Whittington
(74) *Attorney, Agent, or Firm* — Lorenz & Kopf, LLP

(57) ABSTRACT

A system and method is taught for data processing in an autonomous vehicle control system. Using information is acquired from the vehicle, network interface, and sensors mounted on the vehicle, the system can perceive situations around it with much less complexity in computation without losing crucial details, and then make navigation and control decisions. The system and method are operative to generate situation aware events, store them, and recall to predict situations for autonomous driving.

6 Claims, 5 Drawing Sheets

500

600

EFFICIENT SITUATIONAL AWARENESS BY EVENT GENERATION AND EPISODIC MEMORY RECALL FOR AUTONOMOUS DRIVING SYSTEMS

TECHNICAL FIELD

The present disclosure relates to vehicles controlled by automated driving systems, particularly those configured to automatically control vehicle steering, acceleration, and braking during a drive cycle without human intervention. In particular, the present disclosure teaches a system and method for converting environmental information and moving object information into episodic event structures which are saved, indexed and recalled during autonomous vehicle control.

INTRODUCTION

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Appropriate situation awareness is essential for autonomous driving due to safety concerns. Even though it is desirable to put all available information into autonomous driving decision process; however, for practical implementation, input data to the system should be limited and manageable; therefore it needs to be well-designed for both efficiency and sufficiency for decision making. An autonomous vehicle generally must generate a data structure to perceive situations around the vehicle. Through sensors mounted on the autonomous driving vehicle, a huge amount of information is delivered to the system; therefore, efficient analysis of all perception data for safe driving is crucial. It would be desirable to perceive situations around it with reduced complexity in computation without loss of crucial details to make improved navigation and control decisions.

SUMMARY

Embodiments according to the present disclosure provide a number of advantages. For example, embodiments according to the present disclosure may enable independent validation of autonomous vehicle control commands to aid in diagnosis of software or hardware conditions in the primary control system. Embodiments according to the present disclosure may thus be more robust, increasing customer satisfaction.

The present disclosure describes a method comprising receiving a first plurality of information via a vehicle sensor, receiving a second plurality of information via a network interface, generating an episode in response to a temporal ordering of the first plurality of information and the second plurality of information, receiving a third plurality of information via the vehicle sensor, receiving a fourth plurality of information via the network interface, generating an event in response to the third plurality of information and the fourth plurality of information, comparing the episode to the event to generate a predicted outcome of the event, and generating a control signal in response to the predicted outcome.

Another aspect of the present disclosure describes an apparatus for controlling an autonomous vehicle comprising a sensor for determining a egocentric information in response to at least one object detected around the autonomous vehicle, a network interface for receiving geocentric information of at least one feature proximate to a current location of the autonomous vehicle, a processor for generating a combined coordinate system in response to the egocentric information and the geocentric information, for compiling a temporal episode in response the combined coordinate system observed over a first duration of time, for compiling an event in response to the combined coordinate system observed over a second duration of time, for comparing the event and the episode for predicting a predicted outcome of the event, and for generating a control signal in response to the predicted outcome, and a controller for controlling the autonomous vehicle in response to the control signal.

Another aspect of the present disclosure describes an apparatus comprising a vehicle sensor for receiving a first plurality of information and a third plurality of information, a network interface for receiving a second plurality of information and a fourth plurality of information, and a processor for generating an episode in response to a temporal ordering of the first plurality of information and the second plurality of information, for generating an event in response to the third plurality of information and the fourth plurality of information, for comparing the episode to the event to generate a predicted outcome of the event, and for generating a control signal in response to the predicted outcome.

The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
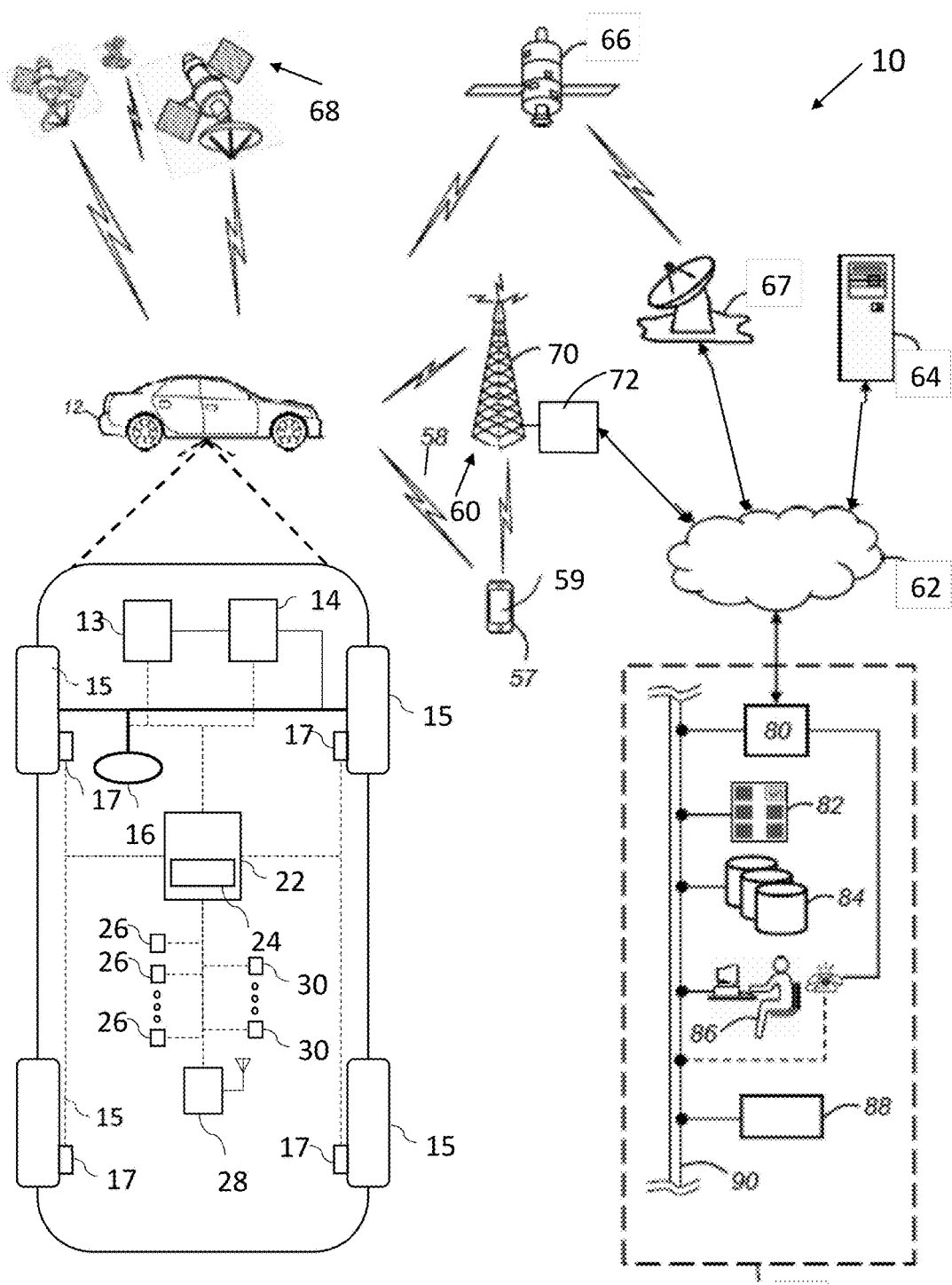
FIG. 1 is a schematic diagram of a communication system including an autonomously controlled vehicle, according to an embodiment.

FIG. 1 schematically illustrates an operating environment that comprises a mobile vehicle communication and control system 10 for a motor vehicle 12. The communication and control system 10 for the vehicle 12 generally includes one or more wireless carrier systems 60, a land communications network 62, a computer 64, a networked wireless device 57 including but not limited to a smart phone, tablet, or wearable device such as a watch, and a remote access center 78.

The vehicle 12, shown schematically in FIG. 1, includes a propulsion system 13, which may in various embodiments include an internal combustion engine, an electric machine such as a traction motor, and/or a fuel cell propulsion system. Vehicle 12 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used.

The vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 12 additionally includes a steering system 16. While depicted as including a steering wheel for illustrative purposes, in some embodiments contemplated within the scope of the present disclosure, the steering system 16 may not include a steering wheel.

The vehicle 12 includes a wireless communications system 28 configured to wirelessly communicate with other vehicles ("V2V") and/or infrastructure ("V2I"). In an exemplary embodiment, the wireless communication system 28 is configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor such as a central processing unit (CPU) or graphics processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

FIG. 1 illustrates several networked devices that can communicate with the wireless communication system 28 of the vehicle 12. One of the networked devices that can communicate with the vehicle 12 via the wireless communication system 28 is the networked wireless device 57. The networked wireless device 57 can include computer processing capability, a transceiver capable of communicating using a short-range wireless protocol, and a visual display 59. The computer processing capability includes a microprocessor in the form of a programmable device that includes one or more instructions stored in an internal memory structure and applied to receive binary input to create binary output. In some embodiments, the networked wireless device 57 includes a GPS module capable of receiving GPS satellite signals and generating GPS coordinates based on those signals. In other embodiments, the networked wireless device 57 includes cellular communications functionality such that the networked wireless device 57 carries out voice and/or data communications over the wireless carrier system 60 using one or more cellular communications protocols, as are discussed herein. The visual display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide uni-directional or bi-directional communication with the vehicle 12. This can be done using one or more communication satellites 66 and an uplink transmitting station 67. Uni-directional communication can include, for example, satellite radio services, wherein programming content (news, music, etc.) is received by the transmitting station 67, packaged for upload, and then sent to the satellite 66, which broadcasts the programming to subscribers. Bi-directional communication can include, for example, satellite telephony services using the satellite 66 to relay telephone communications between the vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62, but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the vehicle 12 via the wireless communication system 28 and the wireless carrier 60. Other computers 64 can include, for example: a service center computer where diagnostic information and other vehicle data can be uploaded from the vehicle via the wireless communication system 28 or a third party repository to or from which vehicle data or other information is provided, whether by communicating with the vehicle 12, the remote access center 78, the networked wireless device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the vehicle 12.

The remote access center 78 is designed to provide the wireless communications system 28 of the vehicle 12 with a number of different system functions and, according to the exemplary embodiment shown in FIG. 1, generally includes one or more switches 80, servers 82, databases 84, live advisors 86, as well as an automated voice response system (VRS) 88. These various remote access center components are preferably coupled to one another via a wired or wireless local area network 90. The switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and the network 90. Data transmissions are passed via the modem to the server 82 and/or the database 84. The database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned remote access center 78 using the live advisor 86, it will be appreciated that the remote access center can instead utilize the VRS 88 as an automated advisor, or a combination of the VRS 88 and the live advisor 86 can be used.

Figure 2:
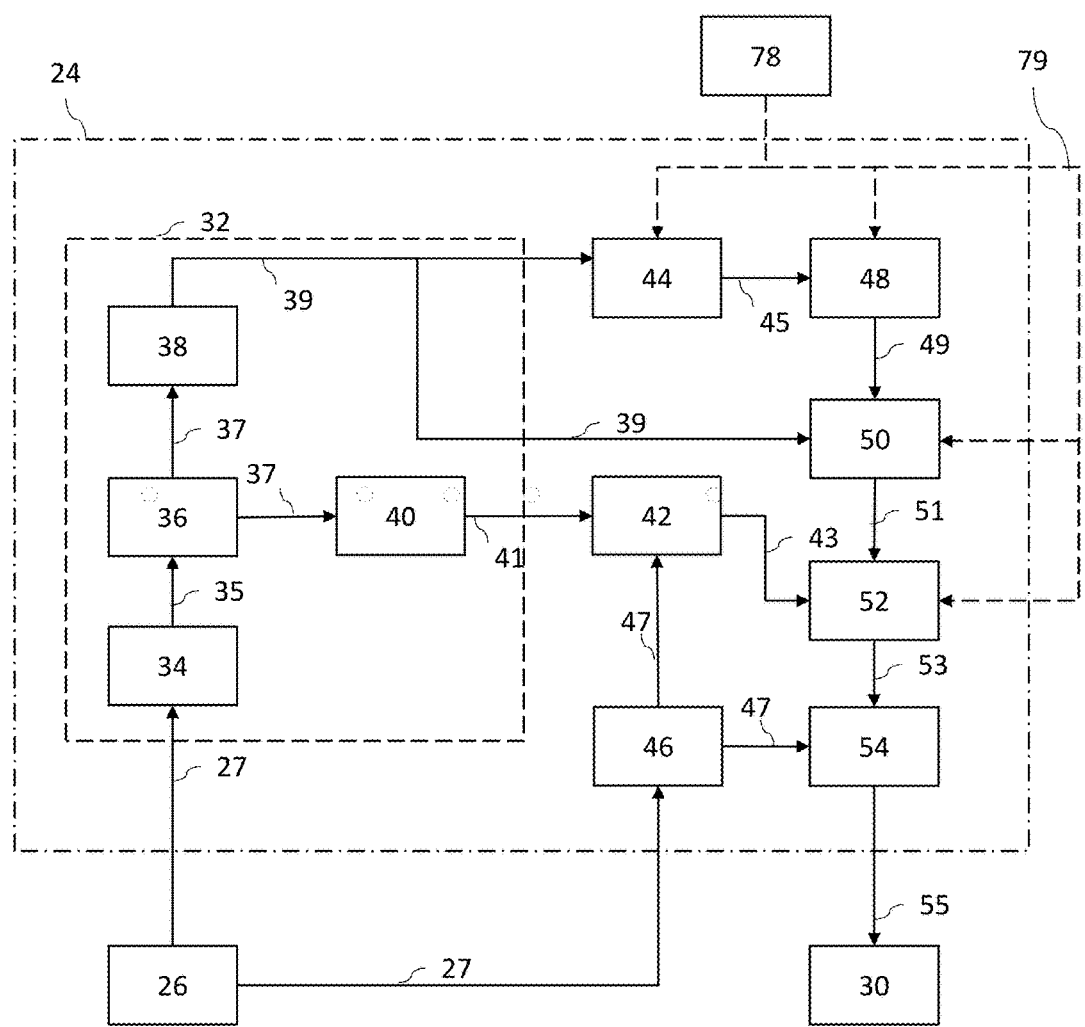
FIG. 2 is a schematic block diagram of an automated driving system (ADS) for a vehicle, according to an embodiment.

As shown in FIG. 2, the ADS 24 includes multiple distinct control systems, including at least a perception system 32 for determining the presence, location, classification, and path of detected features or objects in the vicinity of the vehicle. The perception system 32 is configured to receive inputs from a variety of sensors, such as the sensors 26 illustrated in FIG. 1, and synthesize and process the sensor inputs to generate parameters used as inputs for other control algorithms of the ADS 24.

The perception system 32 includes a sensor fusion and preprocessing module 34 that processes and synthesizes sensor data 27 from the variety of sensors 26. The sensor fusion and preprocessing module 34 performs calibration of the sensor data 27, including, but not limited to, LIDAR to LIDAR calibration, camera to LIDAR calibration, LIDAR to chassis calibration, and LIDAR beam intensity calibration. The sensor fusion and preprocessing module 34 outputs preprocessed sensor output 35.

A classification and segmentation module 36 receives the preprocessed sensor output 35 and performs object classification, image classification, traffic light classification, object segmentation, ground segmentation, and object tracking processes. Object classification includes, but is not limited to, identifying and classifying objects in the surrounding environment including identification and classification of traffic signals and signs, RADAR fusion and tracking to account for the sensor's placement and field of view (FOV), and false positive rejection via LIDAR fusion to eliminate the many false positives that exist in an urban environment, such as, for example, manhole covers, bridges, overhead trees or light poles, and other obstacles with a high RADAR cross section but which do not affect the ability of the vehicle to travel along its path. Additional object classification and tracking processes performed by the classification and segmentation model 36 include, but are not limited to, freespace detection and high level tracking that fuses data from RADAR tracks, LIDAR segmentation, LIDAR classification, image classification, object shape fit models, semantic information, motion prediction, raster maps, static obstacle maps, and other sources to produce high quality object tracks.

The classification and segmentation module 36 additionally performs traffic control device classification and traffic control device fusion with lane association and traffic control device behavior models. The classification and segmentation module 36 generates an object classification and segmentation output 37 that includes object identification information.

A localization and mapping module 40 uses the object classification and segmentation output 37 to calculate parameters including, but not limited to, estimates of the position and orientation of vehicle 12 in both typical and challenging driving scenarios. These challenging driving scenarios include, but are not limited to, dynamic environments with many cars (e.g., dense traffic), environments with large scale obstructions (e.g., roadwork or construction sites), hills, multi-lane roads, single lane roads, a variety of road markings and buildings or lack thereof (e.g., residential vs. business districts), and bridges and overpasses (both above and below a current road segment of the vehicle).

The localization and mapping module 40 also incorporates new data collected as a result of expanded map areas obtained via onboard mapping functions performed by the vehicle 12 during operation and mapping data "pushed" to the vehicle 12 via the wireless communication system 28. The localization and mapping module 40 updates previous map data with the new information (e.g., new lane markings, new building structures, addition or removal of constructions zones, etc.) while leaving unaffected map regions unmodified. Examples of map data that may be generated or updated include, but are not limited to, yield line categorization, lane boundary generation, lane connection, classification of minor and major roads, classification of left and right turns, and intersection lane creation.

In some embodiments, the localization and mapping module 40 uses SLAM techniques to develop maps of the surrounding environment. SLAM is an acronym for Simultaneous Localization and Mapping. SLAM techniques construct a map of an environment and track an object's position within the environment. GraphSLAM, a variant of SLAM, employs sparse matrices which are used to produce a graph containing observation interdependencies.

Object position within a map is represented by a Gaussian probability distribution centered around the object's predicted path. SLAM in its simplest form utilizes three constraints: an initial location constraint; a relative motion constraint, which is the object's path; and a relative measurement constraint, which is one or more measurements of an object to a landmark.

The initial motion constraint is the initial pose (e.g., position and orientation) of the vehicle, which consists of the vehicle's position in two or three dimensional space including pitch, roll, and yaw data. The relative motion constraint is the displaced motion of the object which contains a degree of flexibility to accommodate map consistency. The relative measurement constraint includes one or more measurements from the object sensors to a landmark. The initial location constraint, the relative motion constraint, and the relative measurement constraint are typically Gaussian probability distributions. Object locating methods within a sensor-generated map typically employ Kalman filters, various statistical correlation methods such as the Pearson product-moment correlation, and/or particle filters.

In some embodiments, once a map is built, vehicle localization is achieved in real time via a particle filter. Particle filters, unlike Bayes or Kalman filters, accommodate non-linear systems. To locate a vehicle, particles are generated around an expected mean value via a Gaussian probability distribution. Each particle is assigned a numerical weight representing the accuracy of the particle position to the predicted position. Sensor data is taken into account and the particle weights are adjusted to accommodate the sensor data. The closer the proximity of the particle to the sensor adjusted position, the greater the numerical value of the particle weights.

As an action command occurs, each particle is updated to a new predicted position. Sensor data is observed at the new predicted position and each particle is assigned a new weight representing the accuracy of the particle position with respect to the predicted position and sensor data. The particles are re-sampled, selecting the weights that have the most numerical magnitude, thus increasing the accuracy of the predicted and sensor-corrected object position. Typically the mean, variance, and standard deviation of the resampled data provides the new object position likelihood.

Particle filter processing is expressed as:

$$P(H_t|H_{t-1},A_t,D_t) \quad \text{Equation 1}$$

where $H_t$ is the current hypothesis, which is the object position. $H_{t-1}$ is the previous object position, $A_t$ is the action, which is typically a motor command, and $D_t$ is the observable data.

In some embodiments, the localization and mapping module 40 maintains an estimate of the vehicle's global position by incorporating data from multiple sources as discussed above in an Extended Kalman Filter (EKF) framework. Kalman filters are linear filters based on Recursive Bayesian Filters. Recursive Bayesian Filters, also referred to as Recursive Bayesian Estimation, essentially substitute the posterior of an estimation into the prior position to calculate a new posterior on a new estimation iteration. This effectively yields:

$$P(H_t|H_{t-1},D_1) \quad \text{Equation 2}$$

where the probability of a hypothesis $H_t$ is estimated by the hypothesis at the previous iteration $H_{t-1}$ and the data $D_t$ at current time t.

A Kalman filter adds an action variable $A_t$ where t is a time iteration, yielding:

$$P(H_t|H_{t-1},A_t,D_t) \quad \text{Equation 3}$$

where the probability of a hypothesis $H_t$ is based on the previous hypothesis $H_{t-1}$, an action $A_t$, and data $D_t$ at current time t.

Used extensively in robotics, a Kalman filter estimates a current position, which is a joint probability distribution, and based on an action command predicts a new position which is also a joint probability distribution, called a state prediction. Sensor data is acquired and a separated joint probability distribution is calculated, called a sensor prediction.

State prediction is expressed as:

$$X'_t = AX_{t-1} + B\mu + \varepsilon_t \quad \text{Equation 4}$$

where $X'_t$ is a new state based on the previous state $AX_{t-1}$, $B\mu$, and $\xi_t$. Constants A and B are defined by the physics of interest, $\mu$ is typically a robotic motor command, and $\xi_t$ is a Gaussian state error prediction.

Sensor prediction is expressed as:

$$Z'_t = CX_t + \varepsilon_z \quad \text{Equation 5}$$

where $Z'_t$ is the new sensor estimate, C is a function and $\xi_z$ is a Gaussian sensor error prediction.

A new predicted state estimate is expressed as:

$$X_{EST} = X'_t + K(Z_t - Z'_t) \quad \text{Equation 6}$$

where the product $K(Z_t-Z'_t)$ is referred to as the Kalman gain factor. If the difference between the sensor prediction $Z'_t$ and the actual sensor data $Z_t$ (that is, $Z_t-Z'_t$) is reasonably close to zero, then $X'_t$ is considered to be the new state estimate. If $Z_t-Z'_t$ is reasonably larger than zero, the $K(Z_t-Z'_t)$ factor is added to yield a new state estimate.

As vehicle movement information is received, the EKF updates the vehicle position estimate while also expanding the estimate covariance. Once the sensor covariance is integrated into the EKF, the localization and mapping module 40 generates a localization and mapping output 41 that includes the position and orientation of the vehicle 12 with respect to detected obstacles and road features.

A vehicle odometry module 46 receives data 27 from the vehicle sensors 26 and generates a vehicle odometry output 47 which includes, for example, vehicle heading, velocity, and distance information. An absolute positioning module 42 receives the localization and mapping output 41 and the vehicle odometry information 47 and generates a vehicle location output 43 that is used in separate calculations as discussed below.

An object prediction module 38 uses the object classification and segmentation output 37 to generate parameters including, but not limited to, a location of a detected obstacle relative to the vehicle, a predicted path of the detected obstacle relative to the vehicle, and a location and orientation of traffic lanes relative to the vehicle. Bayesian models may be used in some embodiments to predict driver or pedestrian intent based on semantic information, previous trajectory, and instantaneous pose, where pose is the combination of the position and orientation of an object.

Commonly used in robotics, Bayes' Theorem, also referred to as a Bayesian filter, is a form of conditional probability. Bayes' Theorem, shown below in Equation 7, sets forth the proposition that the probability of a hypothesis H, given data D, is equal to the probability of a hypothesis H times the likelihood of the data D given the hypothesis H, divided by the probability of the data P(D).

$$P(H|D) = \frac{P(H)\ P(D|H)}{P(D)} \quad \text{Equation 7}$$

P(H/D) is referred to as the posterior and P(H) is referred to as the prior. Bayes' Theorem measures a probabilistic degree of belief in a proposition before (the prior) and after (the posterior) accounting for evidence embodied in the data, D. Bayes' Theorem is commonly used recursively when iterated. On each new iteration, the previous posterior becomes the prior to produce a new posterior until the iteration is complete. Data on the predicted path of objects (including pedestrians, surrounding vehicles, and other moving objects) is output as an object prediction output 39 and is used in separate calculations as discussed below.

The ADS 24 also includes an observation module 44 and an interpretation module 48. The observation module 44 generates an observation output 45 received by the interpretation module 48. The observation module 44 and the interpretation module 48 allow access by the remote access center 78. A live expert or advisor, e.g. the advisor 86 illustrated in FIG. 1, can optionally review the object prediction output 39 and provide additional input and/or override automatic driving operations and assume operation of the vehicle if desired or required by a vehicle situation. The interpretation module 48 generates an interpreted output 49 that includes additional input provided by the live expert, if any.

A path planning module 50 processes and synthesizes the object prediction output 39, the interpreted output 49, and additional routing information 79 received from an online database or live expert of the remote access center 78 to determine a vehicle path to be followed to maintain the vehicle on the desired route while obeying traffic laws and avoiding any detected obstacles. The path planning module 50 employs algorithms configured to avoid any detected obstacles in the vicinity of the vehicle, maintain the vehicle in a current traffic lane, and maintain the vehicle on the desired route. The path planning module 50 uses pose-graph optimization techniques, including non-linear least square pose-graph optimization, to optimize the map of car vehicle trajectories in six degrees of freedom and reduce path errors. The path planning module 50 outputs the vehicle path information as path planning output 51. The path planning output 51 includes a commanded vehicle path based on the vehicle route, vehicle location relative to the route, location and orientation of traffic lanes, and the presence and path of any detected obstacles.

A first control module 52 processes and synthesizes the path planning output 51 and the vehicle location output 43 to generate a first control output 53. The first control module 52 also incorporates the routing information 79 provided by the remote access center 78 in the case of a remote take-over mode of operation of the vehicle.

A vehicle control module 54 receives the first control output 53 as well as velocity and heading information 47 received from vehicle odometry 46 and generates vehicle control output 55. The vehicle control output 55 includes a set of actuator commands to achieve the commanded path from the vehicle control module 54, including, but not limited to, a steering command, a shift command, a throttle command, and a brake command.

The vehicle control output 55 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

It should be understood that the disclosed methods can be used with any number of different systems and is not specifically limited to the operating environment shown here. The architecture, construction, setup, and operation of the system 10 and its individual components is generally known. Other systems not shown here could employ the disclosed methods as well.

Figure 3:
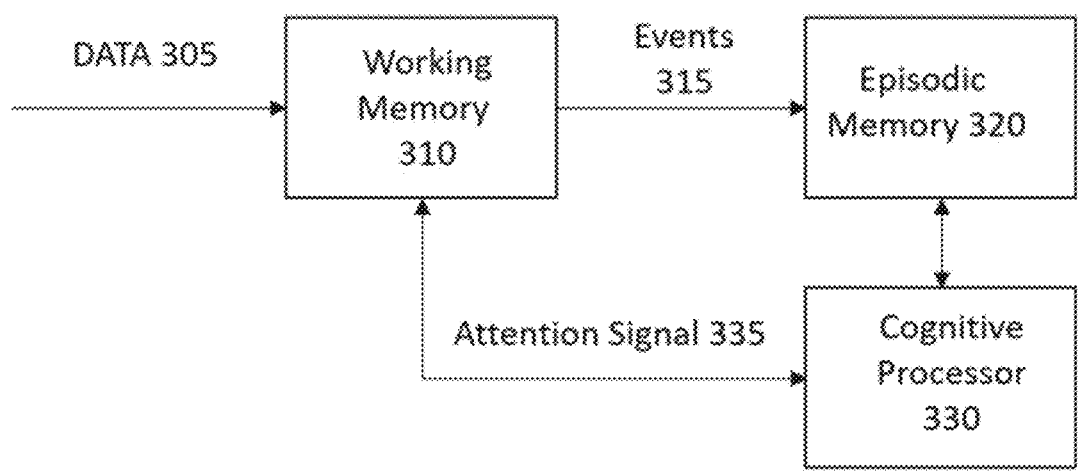
FIG. 3 is a schematic block diagram of an exemplary system for efficient situational awareness by event generation and episodic memory recall.

Turing now to FIG. 3 an exemplary system 300 for efficient situational awareness by event generation and episodic memory recall is shown. The system is operative with a working memory 310, a episodic memory 320 and a cognitive processor 330. The working memory 310 generated events from incoming perceptual stream data 305 is stored. In episodic memory 320, generated episodes from events are stored. Generated events 315 are delivered from the working memory 310 to the episodic memory 320. Once the most appropriate episode is found, the corresponding hypothesis through episodic memory recall is delivered back to the cognitive processor 330. An attention signal 335, is computed by, and coupled between, the cognitive processor 330 and working memory 310. The cognitive processor 330 provides information to working memory 310 for event and episodic information to monitor in incoming perceptual stream data 305. When monitored information is detected by working memory 310, a count is fed back for the occurrences to the Cognitive Processor 330.

According to this exemplary embodiment, an event is a change of situation around the host vehicle, which is caused by motion of the host vehicle, including location changes of adjacent objects, such as vehicles, pedestrians, bikes, etc., and/or environment changes, such as arriving at an intersection. Specifically in the working memory 310, an event structure is generated from perception streams 305, such as perceptual sensors, lane marker detectors, environment information feeder, and the like, the host vehicle status, and the vehicle control system intent.

Figure 4:
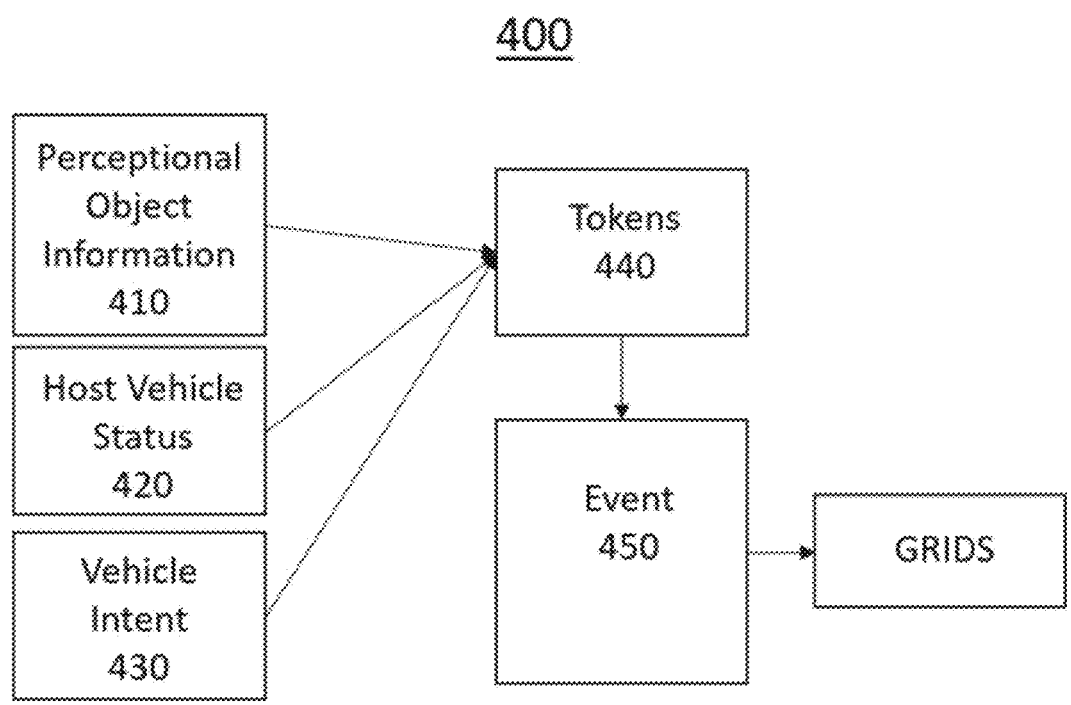
FIG. 4, is a flow chart indicative of an exemplary method for generating an event within working memory.

Turning now to FIG. 4, an exemplary method for generating an event 400 within working memory is shown. Perceptional object information 410 is received via vehicle sensors. The host vehicle status 420 and host vehicle intent 430 are determined. Tokens 440 are generated internally and used to temporarily store for the current event generation and comparison with information from the previous frame or frames. In this exemplary embodiment, perceptual object information 410 may include object type (vehicle, pedestrian, bike, etc.), object location, object motion patterns, lane marker information, sampled lane marker locations in front of the host vehicle, prior environment information, and GPS locations of environmental features which can be acquired from prior knowledge, such as intersection structures, roundabout shapes, etc. Host vehicle status 420 may include host vehicle location in the world coordinate frame, host vehicle velocity, host vehicle orientation within the world coordinate frame. The vehicle intent 430 may use information from a system for direction including intended route, lane changes, traffic, and related information.

Once the tokens 440 are generated and stored in a memory or the like, the system is then operative to generate an event 450 in response to the information within the tokens 440. The tokens are first read by the event generation processor. From the above tokens 440, a header may be generated to define an event type from the information in the current frame. The header may include information such as environment type (highway, intersection, etc.), host intent (left turn, right turn, lane change, etc.), host vehicle status (speed and turning angle), signs or signals (traffic sign or signal in front of self), host location in the geo-centric grid system relative location in the environment-dependent domain. In this exemplary embodiment, when comparing events to categorize situations, if the header information is different, the event may considered as a different event irrespective of other neighborhood object patterns.

Figure 5:
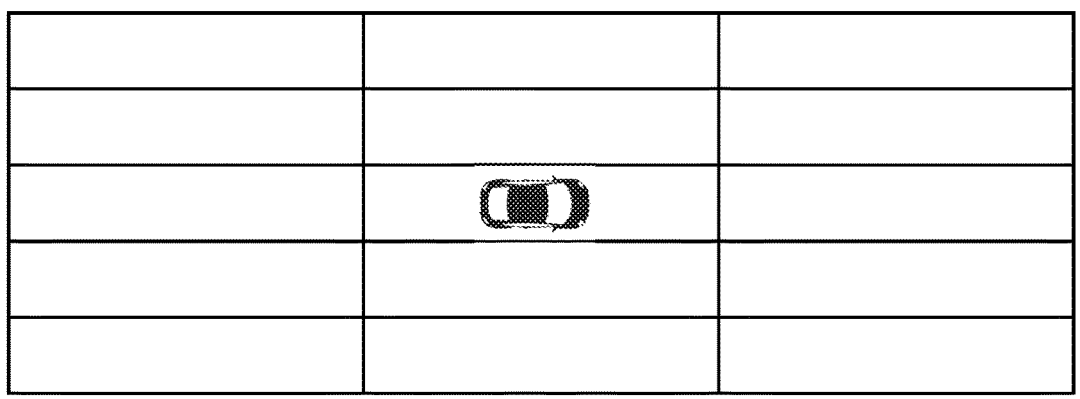
FIG. 5 illustrates a ego-centric grid are generated around the host vehicle.

Once the system builds a header, the method 400 is then operative to generate two grid boundaries. First of all, in any situation, ego-centric grids 500 are generated around the host vehicle as shown in FIG. 5. The physical dimensions of the ego-centric grid cells are adaptive according to environmental features and host-vehicle dynamics. The length of the cell should be large enough for the front and rear safe following distances, which depends on factors such as host speed, speed limit on the road, weather, surface condition of the road, etc. Generally higher speed limit or faster host velocity requires a longer cell length, and the opposite allows a shorter cell size. The width of each cell may be chosen to follow the lane width, or gap between two parallel lane markers, on the road. In the case where lane marker detection is noisy or distorted, the width may be determined as a median gap over several detections for several frames.

Figure 6:
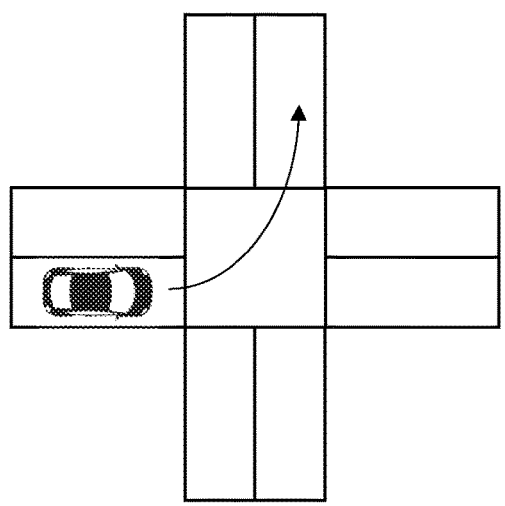
FIG. 6 illustrates a exemplary embodiment of an intersection grid.

The geo-centric grid, or the environment grid, is a grid structure in the world coordinate system. Different from the ego-centric grid, the geo-centric grid is environment dependent and it is generated only when the host vehicle enters specific areas, such as an intersection. The locations and sizes of cells may be determined by the corresponding environment structure and speed limit on the road, weather, or surface condition of the area. When the speed limit is high or the surface of the road is slippery, the length of the cell is long enough for approaching vehicles in high speed. The width of each cell is the width of the road in the corresponding direction. However, if there are any left- or right-turn-only lanes, they might become separate cells. A sample intersection grid 600 is described in FIG. 6 with a left turn intent.

Once the grid information is completed, the method can then generate an outline of the event structure. An exemplary main event structure may consist of three different parts: (1) header which was described earlier; (2) ego-centric grid; and (3) geo-centric grid. Once grid cell boundaries are determined, detected objects from the perception sensors are assigned to the corresponding cells. This assignment will describe each grid cell's status which directly supports situational awareness for autonomous driving. Information both in the ego-centric grid cells and geo-centric grid cells represent relative pose changes to the host vehicle. In this exemplary embodiment, each cell indicates one of the following seven statuses: no object, object incoming, object disappeared, object maintained, object approaching, object moving away, or unknown.

No object may indicate that there is no object in the corresponding cell. Object incoming may indicate that there is a new incoming object into the cell. Object disappeared occurs when the object in the previous frame gets out of the cell. Object maintained may indicate when the relative pose of the object does not change, such as in a highway when a vehicle moves in the same velocity of as the host vehicle. Object approaching may indicate the corresponding object in the cell approaches to the host vehicle. Object moving away indicates the corresponding object in the cell moves away from the host vehicle but still remains in the cell, and unknown occurs when the corresponding cell is occluded by other objects or uncertainty of the cell is too high. If there are multiple objects in a grid cell, the motion of the closest object to the host vehicle determines the status of the cell. This representative characteristic in grids results in an event structure which is more concise and provides an efficient situation description for autonomous driving systems.

In addition to the status representation, the method may further generate more detailed risk values in response to situational evaluations. The risk value in each cell adds details on top of the status value which has been decided, and the value is assigned within a certain interval, such as between 0 and 1. For example, when an object in a cell provides a chance of collision with high probability, a high risk value is assigned to the corresponding cell. The conditions to determine risk levels may include distance to the host vehicle, approaching velocity (heading and speed) relative to the host vehicle, probability distribution for time to collision with the host vehicle, and uncertainty.

The first three factors are related to the host vehicle's position and velocity with respect to the corresponding object. And the last factor indicates limitation of sensor capabilities, which means occlusion by other objects, sensor noise, inaccurate sensor detection due to severe weather conditions, and so on. In case of high uncertainty, the cell may be categorized as unknown, and it has the highest risk level within the certain range from the host vehicle. Eventually, each grid cell has a triple value with element type (grid cell numbers, etc.), grid cell status, and the risk level indicating threat to the host vehicle.

In an additional exemplary embodiment, any status change in any grid cell triggers a new event. A certain pattern of event sequences represent certain types of situations. Therefore, if a specific partial event sequence occurs, the method may predict the following situations with certain probabilities based on previous experience or knowledge. A hierarchical approach is taken to compute the difference between two events. First of all, event difference check should start with agreement of all overhead values. If headers are different between two events, they are allocated into different event types. Once headers are matched, grid cells' information is compared. Distances between two events can be determined with average risk levels.

An episode is a sequence of events chained together in a temporal ordering. A difficulty with respect to episodes is deciding where they begin and where they end. Depending on the application domain, different criteria or methods might be applied. In the autonomous driving domain, the whole entire driving sequence from the starting location to the destination could be thought as one episode. An alternative method is using each item in the turn list generated by a navigation system as an episode, and the whole trip is a collection of short-term episodes. The event sequences in the episodes should be properly aligned to each other and the correspondences between events should be determined. Distances between the corresponding event pairs are collected and summarized to the final result. If there are any noncorresponding (missing or extra) events in the episodes, a penalty might be applied for noncorresponding events.

An episode list stores all episodes in the episodic memory. As with events, the system is operative to develop a method to compare episodes, and subsequently use it in the recall process for episodic memory. In an exemplary embodiment, the process for a binary output may determine if two episodes are the same by comparing the numbers of events and the event sequences. The process for a graded output may be to compute a distance between two episodes. The event sequence in each stored episode may be replaced with a list of pointers pointing to the corresponding nodes in the event-sequence tree. All events in an episode can be accessed indirectly through the pointers to the corresponding nodes. When a new episode is stored into the episode list, the list is checked if there is the same episode. If the same episode is found, the counter in the existing episode is increased and the new episode is discarded to save storage.

A decision tree structure for the episodes is may be effectively implemented to complete exact prefix cues. When two or more episodes have common prefix events at the beginning in their event sequences, they share the corresponding prefix nodes in the tree. As the system goes down the tree comparing each event in the cue with the corresponding node in the tree, the system compares the event in the cue with the node in multiple episodes. When a child of a node is chosen, then all other children of the node are pruned out from further consideration. So, the system may reduce the search space rapidly.

The event sequence in an episode has a temporal order. The input cue for searching the episodes in the episodic memory could be a complete episode or an incomplete partial subsequence. A complete episode cue may be used for inserting a new episode and deleting an obsolete episode. With a partial cue from a live input stream, a system could predict future events based on the suffix or suffixes of the matching episodes. With a partial suffix cue, the system could collect all pre-conditions ended up to the resulting partial cue based on the prefixes of the matching episodes.

Episodic memory represents the knowledge set of stored episodes. The episodic memory may be implemented using the following functionalities: storing episodes, deleting obsolete episodes, recalling existing episodes, and completing a partial cue to existing episodes. Listing all the episodes will be inefficient from both of a memory storage point of view and from an algorithmic point of view. The episodes may be stored efficiently in the view of memory size and memory search as well.

Episodic memory may further be refined by implementing an event-sequence graph to capture the similarities between the stored episodes. All events of the episodes in the episodic memory are collected and stored in an event database using a hash function. The hash function should use key elements in the event structure and should distribute the events as evenly in the buckets in the database as possible for efficient event search. An effective hash function and hash key may depend on the content of events and application domains as well. As a new episode comes into the episodic memory, for each event in the episode, the event database is searched to check if the same or similar event is already in there. If the same or similar event is found in the database, the existing event will be used; otherwise, the new event will be stored into the database. Instead of storing all events, reusing existing events could save memory space and speed up the searching process. This will also help the scalability of the episodic memory. The criteria of the same or similar event depends on the application domain and the levels of abstraction in the event structure.

A hippocampus-like episodic memory in an intelligent cognitive system may be used to store and recall spatio-temporal sequences of data fast and efficiently. In addition to basic store and recall, the episodic memory system may to be able to make partial matches. Due to the potential complexity of spatio-temporal data streams, it is unlikely that different episodes will exactly match. There is consequently a need to do approximate matching returning a distance or similarity measure so various episodes can be ranked according to degree of match or applicability. In addition, as the system will be used to generate expectations; it will also be desirable to perform partial prefix matches where the episodic suffix will represent an expectation. Finally, as it is desirable to store as many episodes as possible, some form of compression or common subsequence recognition may be used to reduce or eliminate duplicated stores of common subsequences which may appear in different episodes.

The episodic system may be augmented with additional mechanisms to decide whether to encode an episode or not, beyond the case that a new episode matches a stored one as described above, and how often episodes are recalled. The episodic memory may contain a counter for each episode to record how many times it has been recalled. This counter may be processed, for instance to encode the number of recalls transformed into log scale. The episodic memory may further implement an encoding threshold parameter, which may be adjusted by the cognitive processor. The system may contain an encoding signal that may be compared to the encoding threshold to determine whether an episode is eligible for storage, after which the process described above is applied if the threshold is met and/or surpassed. The encoding signal may be multidimensional, and capture elements of context from other modules, as well as statistics from the events and episodic information itself. In an exemplary embodiment, the encoding signal may be implemented as a combination of the following signals: 1) A novelty signal computed from the metrics of recall using the distance or similarity measure described above for the N closest matching episodes to the cue, where N is determined by the cognitive processor. 2) The Risk signal, aggregated from the events in the input episode (cue) (e.g., sum over all input events). 3) Prediction error signal computed by the cognitive processor, which computes the inverse of the error from the hypothesis provided by episodic memory against the current input events. 4) Attention signal, which is computed by the cognitive processor and working memory. The cognitive processor provides information to working memory for event and episodic information to monitor in incoming perceptual stream data. When monitored information is detected by working memory, a count is fed back for the occurrences to the Cognitive Processor. This is processed (e.g., sum) and provided at the attentional signal used in the Encoding Signal. 5) Weights for the combination of signals 1-4, computed by the Cognitive Processor.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method comprising:
   receiving a first plurality of information via a vehicle sensor;
   receiving a second plurality of information via a network interface;
   generating a combined coordinate system in response to a first coordinate system centered on a moving object and a second coordinate system centered on a fixed location;
   generating an episode in response to a temporal ordering of the first plurality of information and the second plurality of information and the combined coordinate system;
   incrementing a counter corresponding to the episode;
   generating a header in response to the combined coordinate system and the temporal ordering of the first plurality of information and the second plurality of information wherein the header is used to characterize the episode and wherein the header is used as part of a tree structure based classification system for storing the episode;
   storing the episode in a memory in response to the counter exceeding a threshold value;
   receiving a third plurality of information via the vehicle sensor;
   receiving a fourth plurality of information via the network interface;
   generating an event in response to the third plurality of information and the fourth plurality of information;
   comparing the episode to the event to generate a predicted outcome of the event wherein the event corresponds to a first temporal portion of the episode and the predicted outcome of the event corresponds to a second temporal portion of the episode;
   generating a control signal in response to the predicted outcome; and
   controlling a vehicle in response to the control signal.

2. The method of claim 1 further comprising generating a header in response to the temporal ordering of the first plurality of information and the second plurality of information wherein the header includes environment type.

3. The method of claim 1 wherein the episode is generated in comparison to an encoding threshold for encoding the episodes into a memory.

4. A vehicle control system for controlling a vehicle comprising:
   a vehicle sensor for receiving a first plurality of information and a third plurality of information;
   a network interface for receiving a second plurality of information and a fourth plurality of information;
   a counter corresponding to an episode;
   a processor for generating the episode in response to a temporal ordering of the first plurality of information and the second plurality of information, generating a combined coordinate system in response to a first coordinate system centered on a moving object and a second coordinate system centered on a fixed location wherein the episode is generated in response to the combined coordinate system, storing the episode in a memory in response to the counter exceeding a threshold value, for generating an event in response to the third plurality of information and the fourth plurality of information, for comparing the episode to the event to generate a predicted outcome of the event, wherein the event corresponds to a first temporal portion of the episode and the predicted outcome of the event corresponds to a second temporal portion of the episode and for generating a control signal in response to the predicted outcome, and wherein the processor is further operative to generate a header in response to the combined coordinate system and the temporal ordering of the first plurality of information and the second plurality of information wherein the header is used to characterize the episode and wherein the header is used as part of a tree structure based classification system for storing the episode; and
   a controller for controlling the vehicle in response to the control signal.

5. The apparatus of claim 4 wherein the processor is further operative to generate a header in response to the temporal ordering of the first plurality of information and the second plurality of information wherein the header includes environment type.

6. The apparatus of claim 4 wherein the episode is generated after comparison to an encoding threshold for encoding the episodes into a memory.

* * * * *